US010081152B2

United States Patent
Huizinga et al.

(10) Patent No.: US 10,081,152 B2
(45) Date of Patent: Sep. 25, 2018

(54) APPARATUS AND METHOD FOR CREATING CORRUGATED CARDBOARD, IN PARTICULAR ON THE SITE OF SYSTEMS FOR AUTOMATICALLY FORMING PACKAGING BOXES

(71) Applicant: NEOPOST TECHNOLOGIES B.V., Drachten (NL)

(72) Inventors: Erik Huizinga, Drachten (NL); Reint Smit, Drachten (NL)

(73) Assignee: NEOPOST TECHNOLOGIES B.V., Drachten (NL)

( * ) Notice: Subject to any disclaimer, the term of this patent is extended or adjusted under 35 U.S.C. 154(b) by 300 days.

(21) Appl. No.: 15/010,493

(22) Filed: Jan. 29, 2016

(65) Prior Publication Data

US 2016/0221291 A1    Aug. 4, 2016

(30) Foreign Application Priority Data

Jan. 31, 2015 (EP) .................................... 15153388
Apr. 22, 2015 (EP) .................................... 15164748

(51) Int. Cl.
  *B32B 29/08* (2006.01)
  *B31F 1/28* (2006.01)
  (Continued)

(52) U.S. Cl.
  CPC ............ *B31D 3/005* (2013.01); *B31F 1/2818* (2013.01); *B31F 1/2822* (2013.01);
  (Continued)

(58) Field of Classification Search
  CPC ..... B32B 29/08; B32B 2250/26; B31B 50/10; B31B 2105/001; B31D 3/005;
  (Continued)

(56) References Cited

U.S. PATENT DOCUMENTS 4,086,116 A * 4/1978 Yazaki .................. B31F 1/2804
                                                156/205
4,314,868 A * 2/1982 Hirakawa ............. B31F 1/2886
                                                156/207
(Continued)

FOREIGN PATENT DOCUMENTS

WO    2014/119439 A1    8/2014
WO    2014/191334 A1    12/2014

OTHER PUBLICATIONS

Decision to grant a European patent pursuant to Article 97(1) EPC, dated Jan. 25, 2018, for European Application No. 15164748.4-1016 / 3050809, 2 pages.

*Primary Examiner* — Carson Gross
(74) *Attorney, Agent, or Firm* — Seed IP Law Group LLP

(57) ABSTRACT

A apparatus for creating corrugated cardboard (20) in particular on the site of a system for automatically forming packaging boxes, said corrugated cardboard having at least one corrugated layer (10) between two flat layers (12, 18). The apparatus includes a joining station (16) for attaching a second flat layer (18) to a corrugated layer (10) provided on a first flat layer (12), means for supplying said corrugated layer (10) with the first flat layer (12) attached thereto said joining station (16) and means for supplying said second flat layer (18) to said joining station, means for removing a protective layer (28) from the corrugated layer (10) and/or the second flat layer (18), said protective layer (28) protecting an adhesive substance provided on the corrugated layer (10) or the second flat layer (18).

5 Claims, 3 Drawing Sheets

(51) Int. Cl.
*B31D 3/00* (2017.01)
*B65B 1/28* (2006.01)

(52) U.S. Cl.
CPC .............. *B31F 1/2881* (2013.01); *B65B 1/28* (2013.01); *B31F 1/285* (2013.01); *B32B 29/08* (2013.01); *B32B 2250/26* (2013.01); *B65B 2210/04* (2013.01); *Y10T 156/1025* (2015.01)

(58) Field of Classification Search
CPC .... B31F 1/2818; B31F 1/2822; B31F 1/2881; Y10T 156/1025
USPC ........................................................ 156/210
See application file for complete search history.

(56) References Cited

U.S. PATENT DOCUMENTS

| | | | |
|---|---|---|---|
| 5,944,252 A * | 8/1999 | Connelly | ............... B31D 3/005 229/132 |
| 2008/0020916 A1 | 1/2008 | Magnell | |

\* cited by examiner

APPARATUS AND METHOD FOR CREATING CORRUGATED CARDBOARD, IN PARTICULAR ON THE SITE OF SYSTEMS FOR AUTOMATICALLY FORMING PACKAGING BOXES

BACKGROUND

Technical Field

The present application relates to an apparatus and a method for creating corrugated cardboard, in particular on the site of systems for automatically forming packaging boxes, said corrugated cardboard having at least one corrugated layer between two flat layers. The present application also relates to a system and a method for automatically forming packaging boxes using said apparatus respectively said method.

Description of the Related Art

In recent years, mail ordering has become increasingly common. In order to cope with the increased need for packaging mail ordered items, different systems and methods for automatically forming packaging boxes have been proposed.

US 2008/0020916 A1 discloses a box-making machine, which executes creasing and cutting steps to obtain a cardboard blank, which is then folded to obtain a packaging box from the blank. The subject matter disclosed in the application may be advantageously used in this type and similar types of machines.

For making cardboard blanks to be used in box-making machines, usually a long web of cardboard is fed to such machine either from a roll of corrugated cardboard or from a stack, in which the web is zigzag folded into panels. Corrugated cardboard from a roll is flexible in one direction, as it comprises only one flat layer to which a corrugated layer is attached. Such type of corrugated cardboard is often called "single-faced". Without special measures or treatment, it is not well suited for making packaging boxes.

For making packing packaging boxes, so called "standard" corrugated cardboard, which is rather stiff as it comprises a corrugated layer sandwiched between to flat layers, is preferred. However, such cardboard cannot be stored on a roll and hence is usually provided in form of a stack of zigzag folded panels.

Zigzag folded cardboard has the disadvantage that there are transversal folds in the source material at the positions where the panels are connected. These folds are usually not at positions where folds are needed in a blank that is to be cut from the source material. This is especially the case, when the sizes of the blanks to be cut vary while the panels in a stack of cardboard have a fixed size.

Avoiding that a fold in the source material will appear in the blank limits the maximum blank size (namely to the distance between two folds), and causes an undesired amount of waste material. When such folds are present in a blank that is used to fold a packaging such as a box, there is a risk that the blank will not be folded at the intended crease lines, but at the folds that are already present in the source material. This may cause undesired effects during or after the fold process and may cause crashes and/or damage to the packaging and/or articles being packed or result in an undesired appearance of the packaging and/or insufficient protection of the articles inside the packaging.

International patent application PCT/EP2014/060782 proposes an apparatus and a method that allow rigidifying cardboard having at least one fold and obtaining packaging material with increased stiffness from a cardboard stack that is formed by zigzag folding a cardboard web into panels connected via transverse folds, by applying creasing means to form in particular line-shaped indentations on at least one side of said cardboard, wherein at least some of said indentations intersect said at least one fold. This apparatus and method advantageously improve the production of cardboard boxes using cardboard from a stack of a zigzag folded cardboard web with transverse folds in respect of preciseness and/or stability of the cardboard boxes.

However, while the apparatus and method disclosed in PCT/EP2014/060782 work perfectly well in many cases, just forming indentions that intersect the unwanted folds may not in all cases lead to sufficient stiffness, in particular when rather thin material is used and/or the formed boxes are rather big and/or items to be packaged in said boxes are rather heavy.

WO 2014 119439 A1 discloses different methods for creating said standard corrugated cardboard (cardboard having at least one corrugated layer sandwiched between two flat layers) on the site of a system for automatically forming packaging boxes. According to one of the methods, single-faced corrugated cardboard from a roll is provided and a second flat layer is glued to it. Another method comprises forming a corrugated layer on-site and gluing two flat layers onto opposite sides of the thus created corrugated layer. However, it has turned out in practice that the gluing unit needed for applying glue to the respective layers on-site is rather complex, costly and requires a lot of maintenance.

WO 2014 119439 A1 also discloses a method of forming so-called "double corrugated" cardboard, in which the corrugated sides of two single-faced corrugated cardboards are brought into engagement with each other with little or no glue. However, it has turned out that without glue the cohesion between the two single-faced cardboards is not sufficient. Moreover, double-corrugated cardboard with two corrugated layers means using a lot of material, which not only increases costs and weight of the packaging boxes formed therefrom, but also increases waste.

BRIEF SUMMARY

Disclosed herein are an apparatus and a method that allow an improved creation of cardboard on the site, where the cardboard is needed, in particular on the site of a system for automatically forming packaging boxes.

Advantageous embodiments and implementations are described. Also described is a system for automatically forming packaging boxes from cardboard comprising an apparatus for creating cardboard. Such system will typically comprise numerous stations like a station for cutting out blanks, which may be customized individually, a station for providing a blank with crease lines and a station for folding a box from said blank.

Also described is a method for automatically forming packaging boxes from cardboard.

It has turned out that by providing an adhesive substance on either or both of the second flat layer and the corrugated layer, to which already a first flat layer is attached, and prior to putting the second layer and the corrugated layer up for being attached to each other on the site of a system for automatically forming packaging boxes, the complexity of a corresponding apparatus and in particular the maintenance necessary can be substantially reduced, as no gluing unit is necessary. The cardboard thus produced on-site has the wanted properties of standard corrugated cardboard without any unwanted folds. Further objects, features and advantages of the invention will become apparent from the following non-limiting description of preferred embodiments in conjunction with the accompanying drawings.

DESCRIPTION OF PREFERRED EMBODIMENTS

Figure 1:
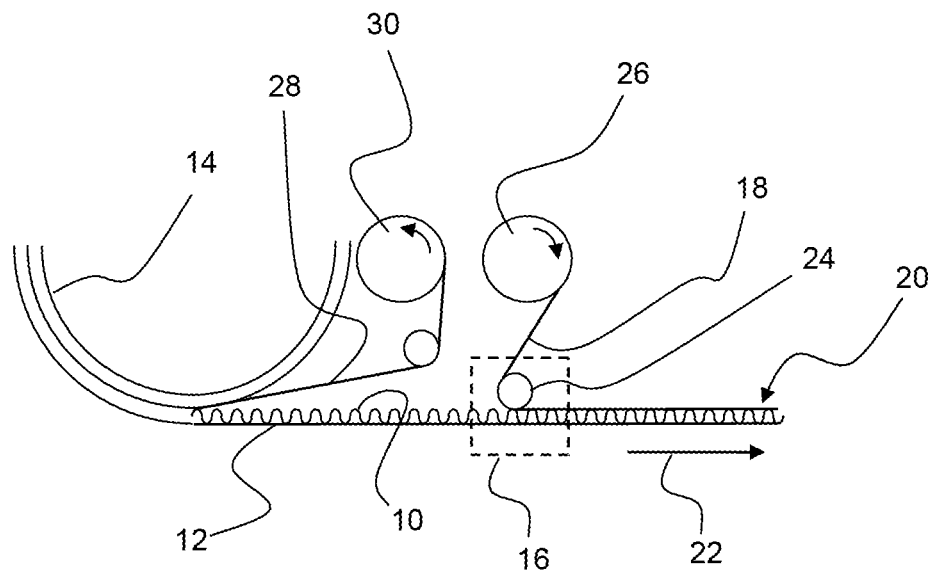
FIG. 1 schematically shows a first embodiment of the invention.

In FIGS. 1 to 6, different embodiments of an apparatus according to the invention for creating corrugated cardboard on the site of a system for automatically forming packaging boxes, said corrugated cardboard having at least one corrugated layer between two flat layers, are shown schematically.

In particular, each apparatus comprises means for supplying single-faced corrugated cardboard, i.e. a corrugated layer 10 attached to a first flat layer 12, from a roll 14, which is shown only partially, to joining station 16, where a second flat layer 18 it is attached to the corrugated layer 10 to form standard corrugated cardboard 20 having a corrugated layer sandwiched between two flat layers. This cardboard can then be fed into a machine for automatically forming packaging boxes. Arrow 22 indicates the direction, in which the cardboard moves through the apparatus. For sake of clarity and in order to avoid overloading the drawings, the respective components are not in all drawings provided with respective reference numbers.

The means for supplying single-faced corrugated cardboard or second flat layer to the joining station can take a large variety of forms, for example: one or more driven rollers, one or more passive rollers, one or more sets of pinch rollers, one or more separators (e.g., edges, oppositely driven rollers, platens), one or more pickers, one or more platens, one or more conveyor belts, one or more conveyor chains, guides, etc. Likewise, the means for removing a protective layer can take a large variety of forms, for example: one or more knives, one or more separators (e.g., edges, oppositely driven rollers, platens), driven rollers, one or more passive rollers, one or more sets of pinch rollers, one or more pickers, one or more platens, one or more conveyor belts, one or more conveyor chains, guides, etc.

As will be described later, joining station 16 may comprise one or more pressing and transporting rollers 24 and other units for attaching the second flat layer 18 to the corrugated layer 10. The second flat layer 18 is supplied from a roll 26 to the joining station 16 with the aid of corresponding supplying means known per se.

In order to avoid that separate gluing means have to be provided for attaching the second flat layer to the corrugated layer, according to at least one embodiment of the invention the second flat layer and/or the corrugated layer is a layer that already carries an adhesive substance that has been applied to the respective layer prior to supplying the layer(s) to the site, where the cardboard shall be formed. The adhesive substance can be of many different types, so that the expert in the art can choose the one that fits the needs of the respective customer best depending in particular on the material used for creating the cardboard, the wanted stability etc. It may even be foreseen that both, the corrugated layer and the second flat layer, have been provided with adhesive substances, which, when brought into contact with each other, show adhesive properties such that the corrugated layer and the second flat layer can easily be wound up for storing and transportation purposes on respective rolls without the need to cover the adhesive substances to prevent that a layer sticks together on the roll. The substances may form a kind of two-component adhesive.

Figure 2:
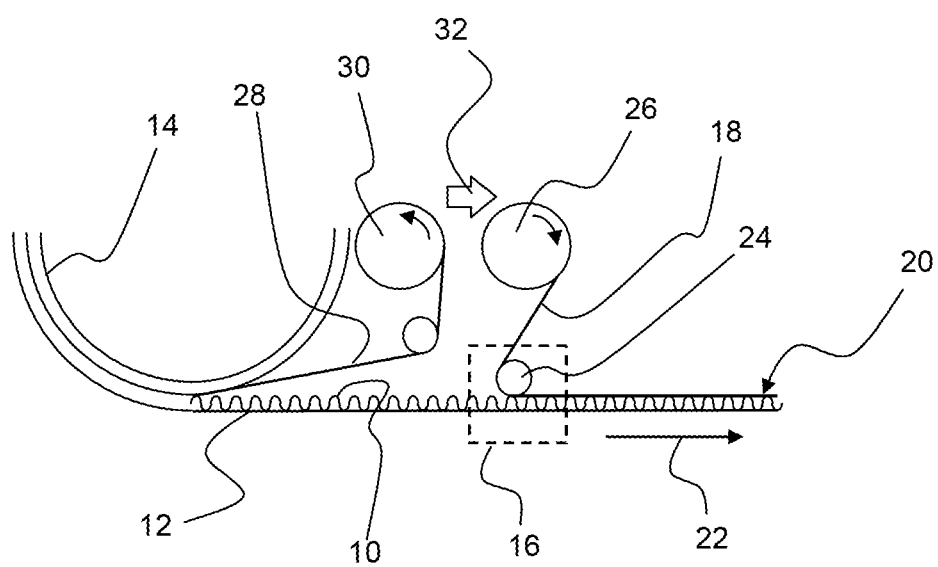
FIG. 2 schematically shows a second embodiment of the invention.
Figure 3:
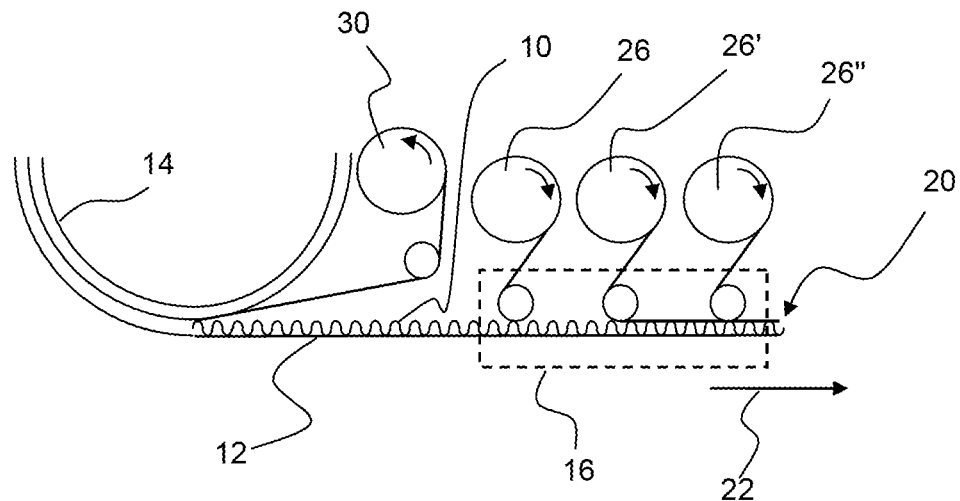
FIG. 3 schematically shows a third embodiment of the invention.

In the embodiments shown in FIGS. 1 to 3, the adhesive substance is provided on the corrugated layer 10 and is of the so-called self-adhesive type used for example for self-adhesive stickers. Obviously, it is sufficient to provide the adhesive substance only on the areas of the crests of the corrugated layer 10, as only those areas will come into contact with the second flat layer 18. In order to facilitate that the single-faced cardboard can be coiled up on roll 14 while preventing that upon coiling-up the side of the corrugated layer 10 provided with the adhesive substance sticks to the first flat layer, a protective layer 28 covering is provided on the corrugated layer and is removed prior to attaching the second flat layer 18 to the corrugated layer 10. The protective layer 28 is wound up on a roll 30 and may then be re-used.

The protective layer may have a first side that not adheres to said adhesive substance and a second side that adheres to the adhesive substance, so that the protective layer can first be used for covering the adhesive substance on the corrugated layer, then be removed and turned and re-used as second flat layer. A corresponding apparatus, which comprises means 32 for supplying the removed protective layer to the means for supplying the second layer, is shown in FIG. 2. The means for supplying the removed protective layer to the means for supplying the second layer can take a large variety of forms, for example: one or more driven rollers, one or more passive rollers, one or more sets of pinch rollers, one or more platens, one or more conveyor belts, one or more conveyor chains, etc.

In order to allow that different customized cardboard is produced on-site of a system for automatically forming packaging boxes, it may be foreseen that different second flat layers are provided, of which one is chosen for creating a certain amount of corrugated cardboard. A corresponding machine is shown in FIG. 3, which in this embodiment comprises three rolls 26, 26' and 26" with different second layers, for example with different printings on it. This allows an operator of a warehouse to offer personalized "drop shipment" for different customers, for which he would send out packages created on-site with the second layer bearing for example the name or logo of the respective customer. Providing different second layers also allows adapting the properties of the cardboard to particular needs, for example to create boxes with water repellent properties and/or a special stability. While FIG. 3 depicts an apparatus for use with corrugated layer having a self-adhesive substance on it, which is protected by a protective layer that has to be removed prior to entering the joining station 16, it is of course possible to provide different second layers also in other types of apparatus such as the ones shown in FIGS. 4 to 6.

Figure 4:
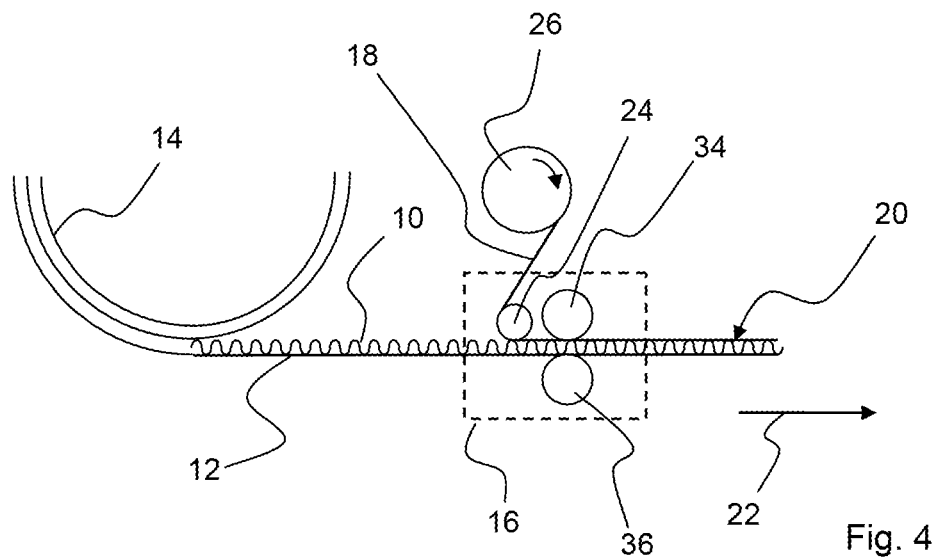
FIG. 4 schematically shows a fourth embodiment of the invention.

FIG. 4 shows an apparatus, in which the joining station 16 comprises a pair of pressing rollers 34 and 36. This apparatus is used when a specific type of adhesive substance (e.g. so called "cold seal") that only sticks to itself is used on both, the corrugated layer 10 and the second flat layer 18. Both, the single-face corrugated board, i.e. the corrugated layer 10 with the first flat layer 12 attached to it, and the second flat layer 17 can be stored on a respective roll. Only when the layers 10 and 18 are pressed together they will stick together and compose a normal corrugated cardboard web. No activation or peeling of is needed, but after merging the layers some pressure must be applied to ensure that the layers stick together properly.

Figure 5:
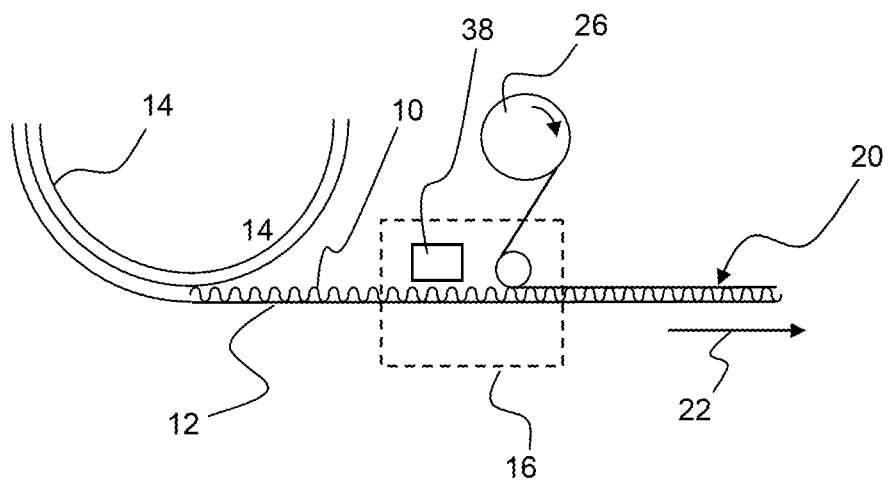
FIG. 5 schematically shows a fifth embodiment of the invention.
Figure 6:
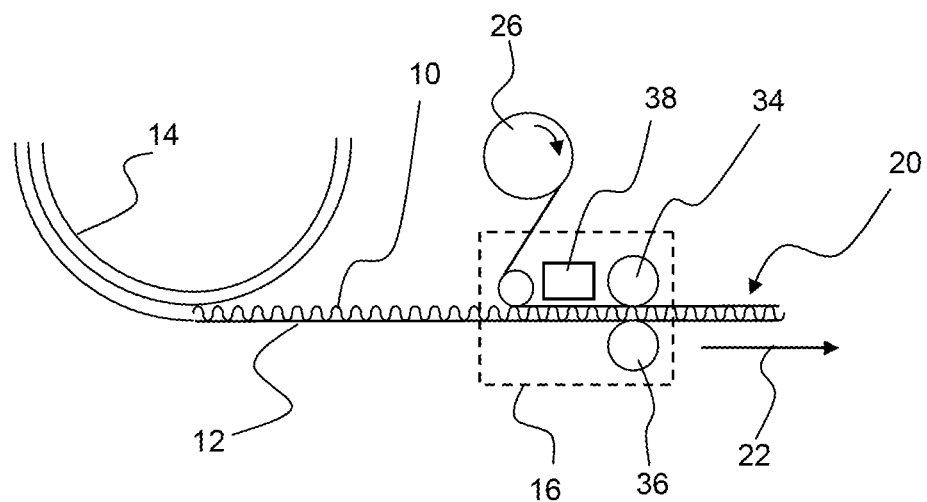
FIG. 6 schematically shows a sixth embodiment of the invention.

FIGS. 5 and 6 show different apparatus in which the joining station 16 also comprises an activation unit 38, which, depending on the type of adhesive substance used, may be provided before or after the corrugated layer 10 comes into contact with the second flat layer 18. Again, the joining station may or may not comprise a pair of pressing rollers 34 and 36.

For certain applications, it may be advantageous to use a type of adhesive substance provided on the corrugated layer and/or the second flat layer that has to be activated, in particular by heat, light, a liquid (like e.g. water), pressure or the like, to show adhesive properties. Accordingly, the activation unit may comprise means for generating heat (e.g., one or more heat lamp and/or resistive heater element), light (e.g., one or more incandescent light bulbs, LEDs, UV incandescent and/or UV LEDs), pressure (e.g., pinch rollers, platen and anvil) and/or for spraying said liquid (e.g., nozzle and/or pump or compressor or reservoir).

While FIG. 5 shows an apparatus to activate an adhesive substance provided on the corrugated layer, it is obvious that such substance may additionally or alternatively be also provided on the second flat layer 18, in case of which a corresponding activation unit has to be arranged accordingly. FIG. 6 shows an apparatus, in which the adhesive substance is activated after the layers are merged together. After the activation, the layers are pressed together by a pair of pressing rollers 34 and 36. Of course, multiple pairs of such rollers may be provided.

LIST OF REFERENCE NUMBERS 10 corrugated layer
12 first flat layer
14 roll of first layer material
16 joining station
18 second flat layer
20 corrugated cardboard
22 direction of movement of cardboard
24 pressing and transporting roller
26 roll of second layer material
28 protective layer
30 roll for used protective layer
32 means for supplying removed protective layer
34 pressing roller
26 pressing roller

The invention claimed is:

1. A method for creating corrugated cardboard on a site of a system for automatically forming packaging boxes, said corrugated cardboard having at least one corrugated layer between two flat layers, the method comprising:
    providing a corrugated layer attached to a first flat layer; and
    attaching a second flat layer to the corrugated layer such that the corrugated layer is sandwiched between the first and the second flat layers,
    wherein at least one of said second flat layer or said corrugated layer is a layer that already carries an adhesive substance which has been applied to said second flat layer and/or said corrugated layer prior to supplying it to the site, where the cardboard shall be created; and
    wherein attaching a second flat layer to the corrugated layer such that the corrugated layer is sandwiched between the first and second flat layers comprises at least one of:
    removing a protective layer covering said adhesive substance prior to attaching the second flat layer to the corrugated layer, or
    contacting the corrugated layer and the second flat layer, each of which have been provided with adhesive substances, and which, when brought into contact with each other, show adhesive properties, or
    activating the adhesive substance, which is a substance that has to be activated by heat, light, a liquid, or pressure to show adhesive properties.

2. A method according to claim 1, wherein said adhesive substance is provided on said corrugated layer and wherein said protective layer has a first side that does not adhere to said adhesive substance and a second side that does adhere to said adhesive substance, wherein the protective layer is used as said second flat layer.

3. A method according to claim 1, wherein the corrugated layer and the second flat layer each have been provided with adhesive substances, which, when brought into contact with each other, exhibit adhesive properties.

4. A method according to claim 1, wherein the adhesive substance is a substance that has to be activated by at least one of heat, light, a liquid, or pressure, to activate adhesive properties.

5. A method according to claim 1, further comprising: selecting one of a plurality of second flat layers provided on-site of the system for forming packaging boxes as second layer for creating a certain amount of corrugated cardboard.

* * * * *

UNITED STATES PATENT AND TRADEMARK OFFICE
CERTIFICATE OF CORRECTION

PATENT NO. : 10,081,152 B2  
APPLICATION NO. : 15/010493  
DATED : September 25, 2018  
INVENTOR(S) : Erik Huizinga et al.

Page 1 of 1

It is certified that error appears in the above-identified patent and that said Letters Patent is hereby corrected as shown below:

In the Claims

Column 6, Line 25, Claim 1:
"the first and second flat layers"
Should read:
--the first and the second flat layers--.

Signed and Sealed this
Thirteenth Day of August, 2019

Andrei Iancu
*Director of the United States Patent and Trademark Office*